US012762585B2

(12) United States Patent
Sills

(10) Patent No.: US 12,762,585 B2
(45) Date of Patent: Oct. 13, 2026

(54) SYSTEM OF DEMAND MODELING AND PRICE CALCULATION BASED ON INTERPOLATED MARKET PRICE ELASTICITY FUNCTIONS

(71) Applicant: Clear Demand, Inc., Scottsdale, AZ (US)

(72) Inventor: James A. Sills, Scottsdale, AZ (US)

(73) Assignee: Clear Demand, Inc., Scottsdale, AZ (US)

( * ) Notice: Subject to any disclaimer, the term of this patent is extended or adjusted under 35 U.S.C. 154(b) by 0 days.

(21) Appl. No.: 18/402,422

(22) Filed: Jan. 2, 2024

(65) Prior Publication Data

US 2024/0221012 A1 Jul. 4, 2024

Related U.S. Application Data

(63) Continuation of application No. 15/721,407, filed on Sep. 29, 2017, now Pat. No. 11,861,637.

(Continued)

(51) Int. Cl.

*G06Q 30/00* (2023.01)

*G06Q 10/067* (2023.01)

(Continued)

(52) U.S. Cl.

CPC ....... *G06Q 30/0206* (2013.01); *G06Q 10/067* (2013.01); *G06Q 40/12* (2013.12)

(58) Field of Classification Search

None

See application file for complete search history.

(56) References Cited

U.S. PATENT DOCUMENTS 6,049,774 A * 4/2000 Roy ................. G06Q 10/06315 705/7.22

6,061,691 A * 5/2000 Fox .................... G06Q 30/0206 705/28

(Continued)

FOREIGN PATENT DOCUMENTS

CA 2805264 A1 * 8/2013 ............. G06Q 30/00

WO WO-9956192 A2 * 11/1999 ............. G06Q 40/00

WO WO-3083732 A2 * 10/2003 ............ G06W 30/00

OTHER PUBLICATIONS

Munson, Charles Lee. "Quantity Discounts: Their Impact on Centralized Purchasing Decisions and Their Role in Coordinating Supply Chains." (May 1998). Retrieved online Mar. 10, 2022. https://www.proquest.com/openview/ae08bb3d01f1a0963dd3ebcc4f9f58b3/1?pq-origsite=gscholar&cbl=18750&diss=y (Year: 1998).*

(Continued)

*Primary Examiner* — James A Reagan

(74) *Attorney, Agent, or Firm* — Polsinelli PC

(57) ABSTRACT

Systems and computer-readable media for generating dynamic pricing rules to govern offered price-volume break points. Initial target price-volume break points are offered during a time window. For each transaction of the product, transaction information including the transacted price, quantity, and identifying information of the purchaser is received. Based on a sales trend determined from the transaction information, the time window and the offered price can be updated. After the expiration of the time window, redemptions are generated for each purchaser of the product, based at least in part on the final quantity sold during the time window and the offered price-volume break points. A market price elasticity function is interpolated from observed market price elasticities at each price-volume break point. Using the market price elasticity function, dynamic pricing rules (Continued)

100

| | |
|---|---|
| Product | Genesis E-310 Gas Grill |
| Brand | Weber |
| Description | 3 stainless steel burners, porcelain-enameled Flavorizer bars |
| Color | Black |
| Current Volume Sold | 11 |
| Offer Period Expires | 5 PM EST May 25, 2017 |

150

| Volume | Price |
|---|---|
| 1-10 | $699 |
| 11-30 | $649 |
| 31-100 | $599 |
| 101-300 | $499 |
| 300+ | $399 |

are optimized and updated and then used to calculate updated price-volume break points to be offered for the product.

21 Claims, 4 Drawing Sheets

Related U.S. Application Data

(60) Provisional application No. 62/401,558, filed on Sep. 29, 2016.

(51) Int. Cl.
*G06Q 30/0201* (2023.01)
*G06Q 40/12* (2023.01)

(56) References Cited

U.S. PATENT DOCUMENTS

| | | | | | |
|---|---|---|---|---|---|
| 6,101,484 | A * | 8/2000 | Halbert | G06Q 40/00 | 705/26.2 |
| 6,553,352 | B2 * | 4/2003 | Delurgio | G06Q 20/201 | 705/400 |
| 6,988,076 | B2 * | 1/2006 | Ouimet | G06Q 10/06375 | 705/5 |
| 7,062,447 | B1 * | 6/2006 | Valentine | G06Q 30/0206 | 703/2 |
| 7,092,896 | B2 * | 8/2006 | Delurgio | G06Q 30/0206 | 705/400 |
| 7,092,918 | B1 * | 8/2006 | Delurgio | G06Q 30/0206 | 705/400 |
| 7,240,019 | B2 * | 7/2007 | Delurgio | G06Q 10/04 | 705/400 |
| 7,249,031 | B2 * | 7/2007 | Close | G06Q 10/04 | 705/400 |
| 7,249,033 | B1 * | 7/2007 | Close | G06Q 30/0206 | 705/400 |
| 7,467,103 | B1 * | 12/2008 | Murray | G06Q 30/0605 | 705/26.2 |
| 7,523,047 | B1 * | 4/2009 | Neal | G06Q 30/06 | 705/7.35 |
| 7,593,871 | B1 * | 9/2009 | Mesaros | G06Q 30/0613 | 705/26.2 |
| 7,742,960 | B2 * | 6/2010 | Cheliotis | G06Q 40/12 | 705/400 |
| 7,937,294 | B1 * | 5/2011 | Murray | G06Q 30/02 | 705/26.2 |
| 7,979,318 | B1 * | 7/2011 | Morton | G06Q 30/02 | 705/26.1 |
| 9,922,338 | B2 * | 3/2018 | Ovick | G06Q 30/0225 | |
| 9,990,646 | B2 * | 6/2018 | Salmon | G06Q 20/387 | |
| 10,290,012 | B2 * | 5/2019 | Liu | G06Q 30/0206 | |
| 11,023,917 | B2 * | 6/2021 | Rego | G06Q 30/0235 | |
| 11,062,366 | B2 * | 7/2021 | Metnick | G06Q 30/0613 | |
| 11,195,193 | B2 * | 12/2021 | Liu | G06Q 30/0206 | |
| 2002/0165760 | A1 * | 11/2002 | Delurgio | G06Q 10/0639 | 705/400 |
| 2002/0165834 | A1 * | 11/2002 | Delurgio | G06Q 30/0206 | 705/400 |
| 2003/0110072 | A1 * | 6/2003 | Delurgio | G06Q 30/02 | 705/7.35 |
| 2006/0195345 | A1 * | 8/2006 | Close | G06Q 30/0202 | 705/400 |
| 2008/0255973 | A1 * | 10/2008 | El Wade | G06Q 30/06 | 705/35 |
| 2009/0030829 | A1 * | 1/2009 | Chatter | G06Q 40/025 | 705/37 |
| 2009/0239459 | A1 * | 9/2009 | Watts | G07F 9/08 | 453/18 |
| 2010/0223104 | A1 * | 9/2010 | Patel | G06Q 30/0283 | 707/723 |
| 2012/0191541 | A1 * | 7/2012 | Yang | G06Q 30/0241 | 705/14.73 |
| 2012/0271748 | A1 * | 10/2012 | DiSalvo | G06Q 40/04 | 705/37 |
| 2013/0024254 | A1 * | 1/2013 | Libenson | G06Q 30/02 | 705/14.1 |
| 2013/0024257 | A1 * | 1/2013 | Libenson | G06Q 30/02 | 705/14.21 |
| 2013/0024262 | A1 * | 1/2013 | Libenson | G06Q 30/02 | 705/14.25 |
| 2013/0024267 | A1 * | 1/2013 | Libenson | G06Q 30/02 | 705/14.38 |
| 2013/0066803 | A1 * | 3/2013 | Worlikar | G06Q 40/06 | 705/36 R |
| 2013/0211877 | A1 * | 8/2013 | Kushkuley | G06Q 30/0202 | 705/7.31 |
| 2013/0211878 | A1 * | 8/2013 | Kushkuley | G06Q 30/0202 | 705/7.31 |
| 2014/0149183 | A1 * | 5/2014 | Liu | G06Q 30/0206 | 705/7.35 |
| 2015/0120394 | A1 * | 4/2015 | Bhattacharya | G06Q 30/0211 | 705/7.35 |
| 2015/0120409 | A1 * | 4/2015 | Bhattacharya | G06Q 30/0211 | 705/14.13 |
| 2015/0302442 | A1 * | 10/2015 | Hartnell | G06Q 30/0206 | 705/7.35 |
| 2015/0302456 | A1 * | 10/2015 | Rego | G06Q 30/0235 | 705/14.35 |
| 2015/0317653 | A1 * | 11/2015 | Ettl | G06Q 30/0202 | 705/7.31 |
| 2016/0225082 | A1 * | 8/2016 | Sachs | G06Q 40/04 | |
| 2016/0232501 | A1 * | 8/2016 | Unser | G06Q 20/102 | |
| 2016/0283954 | A1 * | 9/2016 | Lei | G06Q 30/0202 | |
| 2017/0372392 | A1 * | 12/2017 | Metnick | G06Q 30/0613 | |
| 2018/0089707 | A1 * | 3/2018 | Sills | G06Q 10/067 | |
| 2019/0347681 | A1 * | 11/2019 | Liu | G06Q 30/0206 | |

OTHER PUBLICATIONS

• Arellano, Fernando E. “Cost Structure, Price Elasticity, and Oligopolistic Pricing: a Simulation Approach.” (Summer 1997). https://search.proquest.com/openview/f88c1cf836d00702660522a347d11d9a/1?pq-origsite=gscholar&cbl=18750&diss=y (Year: 1997).*

• quickgrid. “Managerial Accounting: Break Even Point Analysis.” (Aug. 7, 2015). Retrieved online Mar. 2, 2025. https://quickgrid.wordpress.com/2015/08/07/managerial-accounting-break-even-point-analysis/ (Year: 2015).*

Munson, Charles Lee; “Quantity Discounts: Their Impact on Centralized Purchasing Decisions and Their Role in Coordinating Supply Chains,” Dissertation presented to the Graduate School of Arts and Sciences of Washington University, May 1998, pp. i-vi, 1-5, and 166-182.

Arellano, Fernando E., “Cost Structure, Price Elasticity, and Oligopolistic Pricing: a Simulation Approach,” Di8ssertation presented to Department of Economics, Colorado State University, Summer 1997, pp. i-x, 1-8, 228-234.

* cited by examiner

100

| | |
|---|---|
| **Product** | Genesis E-310 Gas Grill |
| **Brand** | Weber |
| **Description** | 3 stainless steel burners, porcelain-enameled Flavorizer bars |
| **Color** | Black |
| **Current Volume Sold** | 11 |
| **Offer Period Expires** | 5 PM EST May 25, 2017 |

FIG. 1A

150

| Volume | Price |
|---|---|
| 1-10 | $699 |
| 11-30 | $649 |
| 31-100 | $599 |
| 101-300 | $499 |
| 300+ | $399 |

FIG. 1B

SYSTEM OF DEMAND MODELING AND PRICE CALCULATION BASED ON INTERPOLATED MARKET PRICE ELASTICITY FUNCTIONS

CROSS-REFERENCE TO RELATED APPLICATIONS

This application is a continuation of, and claims priority to, U.S. patent application Ser. No. 15/721,407 entitled SYSTEM OF DEMAND MODELING AND PRICE CALCULATION BASED ON INTERPOLATED MARKET PRICE ELASTICITY FUNCTIONS filed Sep. 29, 2017, which claims priority to U.S. Provisional Application 62/401,558, entitled RETAIL PRICING METHOD THAT REWARDS SHOPPERS BASED ON SUBSEQUENT SALES filed Sep. 29, 2016, all of which is hereby expressly incorporated herein by reference in their entireties.

FIELD

The present disclosure generally relates to demand modeling and price calculation, and more specifically pertains to generating dynamic pricing rules for calculating price-volume break points.

BACKGROUND

There has been a steady evolution in retail science towards solutions with greater sensitivity to business realities of the online world. Existing price optimization tools set prices based on predicted unit sales at various price points, such that retailers can elect to set their prices on profit, revenue, or other desired metrics. However, these pricing tools are suggestive at best, meaning that they offer no guarantees of success—only an increased probability. These tools are further complicated by the accessibility of information inherent to online environments, as price determinations must be made over a vast array of factors and inputs available. Early mathematical solutions in price optimization made retailers more revenue and profit as a whole, but often generated solutions that failed to account for the real-world consequences of a failed price adjustment, which can range from a mild annoyance to an unmitigated disaster.

For example, for price-sensitive products (i.e. those with relatively high price elasticities), retailers may set lower prices in hopes that unit sales will increase sharply as prices decrease. However, if unit sales fail to respond as predicted to a price decrease, meaning that unit sales remain relatively flat or otherwise increase significantly less than expected, then a retailer will lose money on this decision.

As such, the retailer bears all of the risk in price adjustments, which thereby introduces undesirable volatility to the retailer's business. In light of this possible volatility, many retailers are unwilling to aggressively price optimize, preferring instead to maintain stable cash flows rather than optimal cash flows.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 1A depicts an example product listing display;

FIG. 1B depicts an example price-volume break point table associated with the example product listing display of FIG. 1A;

Corresponding reference characters indicate corresponding elements among the view of drawings. The headings used in the drawings do not limit the scope of the claims.

DETAILED DESCRIPTION

Figure 2:
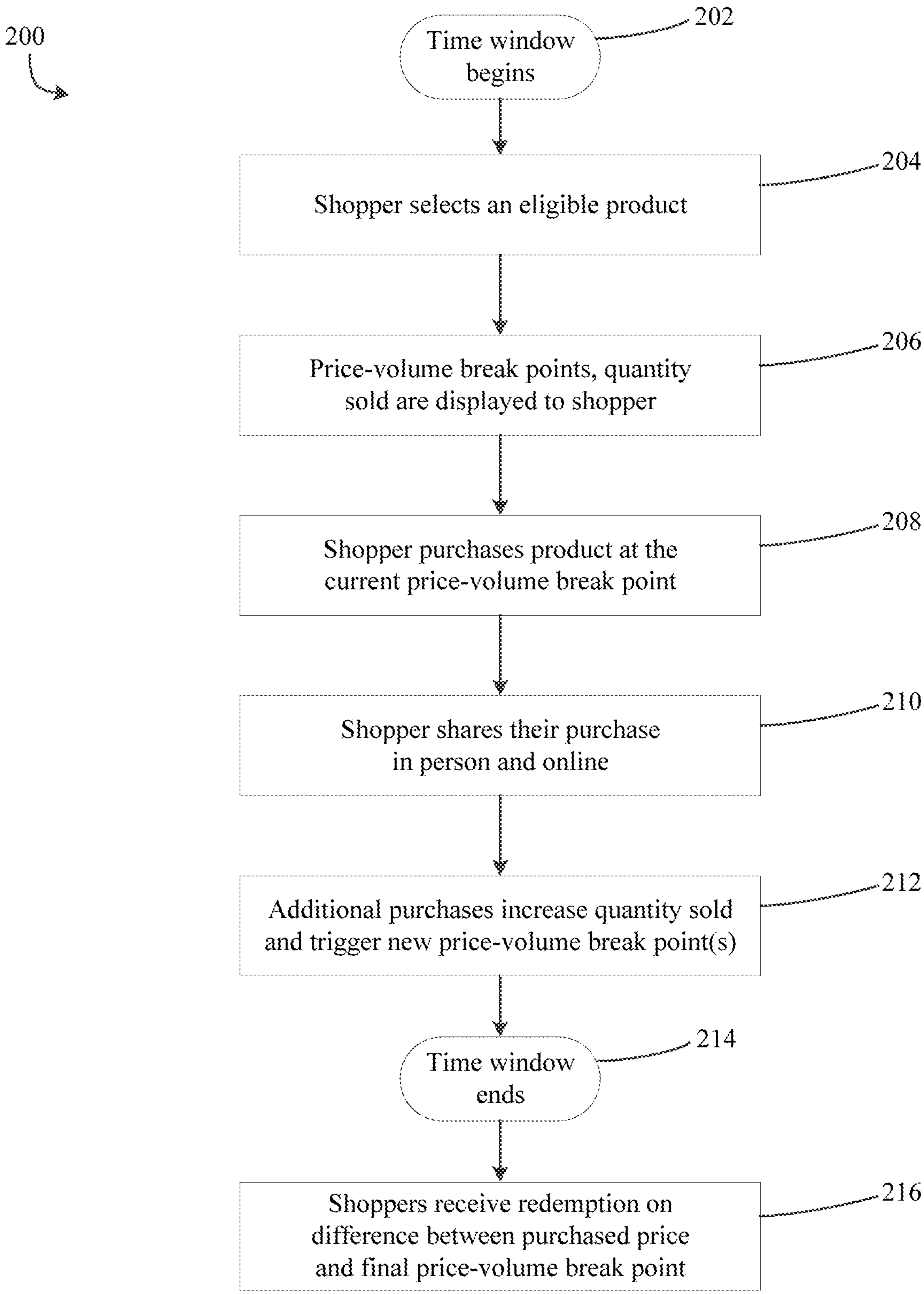
FIG. 2 depicts an example flowchart for providing price-volume break points.

The present disclosure addresses the need in the art for a technique for demand modeling and price determination for price-volume break points as they pertain to a given product. Disclosed are systems and computer readable media for receiving transaction information, interpolating market price elasticity functions, and optimizing over the interpolated market price elasticity functions to generate dynamic pricing rules for calculating updated price-volume break points for a given product.

Various embodiments of the disclosure are discussed in detail below. While specific implementations are discussed, it should be understood that this is done for purposes of illustration. A person skilled in the relevant art will recognize that other components and configurations may be used without departing from the spirit and scope of the disclosure.

The disclosure begins with an initial discussion of the concept of price-volume break points, and particularly as these break points relate to the context of retail environments. As is commonly known, many, if not all, vendors are willing to offer bulk purchase discounts, wherein the greater the number of units that are purchased, the lower the price per unit. For example, FIG. 1B presents a table of five price-volume break points 150 that might be offered for a gas grill (detailed in the table 100 of FIG. 1A). The first row of the table indicates the default or standard price point for a purchase that is deemed too small to qualify for one or more volume discounts. Here, if 1-10 units of the gas grill are purchased, the purchaser will pay the standard price of $699 per grill and does not receive a volume discount or trigger a price-volume break point. However, if 11-30 units of the gas grill are purchased, a price-volume break point is triggered and the purchaser will pay a reduced price of $649 per grill, receiving a $50 discount per unit. Further price-volume break points exist between 31-100 units, 101-300 units, and 300+ units. Note that the final price-volume break point, which here is 300+ units, is almost always unbounded on its upper end, as there exists a price at which the vendor can offer no further discount without slipping into unprofitability. These volume discount transactions are generally agreed upon as mutually beneficial for both the vendor and the buyer, as the vendor is able to move a large quantity of units with far less effort than would be required to sell each unit individually while the buyer is able to obtain the units for a cheaper price than would be available if each was sold individually.

Interestingly, the sharing of price-volume break points lends a degree of transparency that is not commonly found in many transactions, as the sell side (i.e. vendors) typically holds a substantial information advantage over the buy side (i.e. purchasers), to the point that true production costs, and therefore profit margins, are often tightly held secrets in the traditional consumer retail environment. This is not always the case with volume sales. As mentioned above, a purchaser or potential purchaser can use the final price-volume break point that is offered as a relatively reliable indicator of the product's actual cost to the vendor, assuming that the vendor is not willing to take a loss. This information sharing can often benefit the vendor, as from the perspective of the purchaser, the knowledge that the true price of the gas grill is closer to $399 can psychologically make the $699 price point for 1-10 units much less appealing, to the point that purchasers are more likely to buy a greater quantity of units in order to pay a less inflated price.

This pricing structure takes advantage of the fact that purchasers seek to minimize the price per unit, whereas vendors seek to maximize their profit per transaction. The two goals are not mutually exclusive, but as would be appreciated by one of ordinary skill in the art, optimal price-volume break points are rarely offered and optimal volume discount agreements are rarely reached. As a whole, price-volume break points have been subject to little in the way of standardization or optimization, particularly in comparison to traditional retail pricing. This is at least in part due to the fact that high volume orders, by their nature, are often infrequently placed. Particularly in the case of business-to-business sales (B2B), various price-volume break points and specific volume discounts are often negotiated by employees of the participating businesses, whether on a solely one-off basis or under general guidelines previously agreed upon by the participating parties. Further still, price-volume break points have by and large been excluded from the traditional retail environment, as individual purchase quantities are too small, often by an order of magnitude or more, to justify a volume discount. The present disclosure addresses both of these problems, providing a price-volume break point optimization system that can be directly tied to a computerized (either distributed or centralized) network for purchases and transactions.

FIG. 2 illustrates an exemplary flowchart 200 for providing price-volume break points to a shopper. It is useful to note that flowchart 200 is generally focused on the shopper experience and interaction, whereas a more comprehensive flowchart focused on system flows and calculations will later be discussed with respect to FIG. 3. Furthermore, in the context of the present disclosure, reference is made to a single product (e.g. singular, "the product"), for sake of convenience and simplicity, although it is understood that the present disclosure may equally be applied to one or more products simultaneously.

Returning now to flowchart 200, the price-volume break point process for the given product is triggered when a time window begins in step 202. This time window can generally be thought of as a period of time over which the price-volume break points for the given product will be available, which generally will be a period of hours or days, although longer or shorter time windows can be employed. In some embodiments, the time window might be pre-determined or received as an input to the system. Alternatively, the system itself can calculate an initial time window based off of various analyses and inputs of historical transaction data. For example, historical transaction data might indicate a correlation between sales or revenue and the length of the initial time window, and might indicate that an initially short time window may drive more sales than an initially long time window, while an initially short time window that is adjusted too many times may drive too many returns or cancellations.

Once triggered, the time window is pushed to all participating retail networks in the system, along with an initial listing of price-volume break point, wherein a quantity sold is initialized to zero and also pushed to the participating retail networks. Retail networks can be viewed with varying degrees of granularity. For example, a retail network might be taken to indicate fundamentally distinct retail environments, e.g. online retail/e-commerce would form a first retail network while brick and mortar stores would form a second retail network. A more granular approach might define retail networks on the basis of a parent corporate or governing entity, e.g. all chains of a first business would form a first retail network, all chains of a second business would form a second retail network, etc. An even further granular approach might define retail networks on the basis of discrete retail locations or e-commerce portals, e.g. each individual store of the first business would form a retail network, each individual store of the second business would form a retail network, an e-commerce portal of the first business would form a retail network, an e-commerce portal of the second business would form a retail network, etc. In some embodiments, the discrete retail locations and e-commerce portals might each be communicatively coupled to the disclosed price-volume break point optimization system. In some embodiments, the discrete retail locations might be arranged in a hierarchical tree, such that the disclosed price-volume break point optimization system only communicates with root or parent nodes of the hierarchical tree, which act as relays between the optimization system and the discrete retail and e-commerce locations.

Independent of the specific arrangement of retail networks, it is contemplated that each retail network is communicatively coupled to the price-volume break point optimization system of the present disclosure such that transaction information can be shared and cumulative sales and current price-volume break point information distributed. In this manner, the disclosed system provides transparency to all retail networks and their constituent members—at any given point of sale, whether online or in-person, the data distribution ensures that a shopper is presented with relevant and up to date information.

At some point in time after the time window has opened and relevant initial price-volume break point information has been propagated out, a shopper selects a product that is eligible for the disclosed price-volume break points in a step 204. In the context of the present discussion, this selection can be active, e.g. clicking a product in an online shopping portal that is tagged as eligible, or passive, e.g. noticing a display in store indicating that a certain product is eligible. In some embodiments, it is contemplated that an application for one or more mobile computing platforms such as iOS™ or Android™ can be provided to close the gap between online and physical retail networks, or to otherwise augment physical retail networks with features from online retail networks. Such an application would be particularly helpful as the present system would be difficult, if not impossible, to implement in a standalone retail environment, i.e. disconnected from the internet. Central to the system's functionality is the ability to transmit, update, and collect information in substantially real-time, such that the price-break points can be dynamically generated and transmitted to shoppers. As such, the ability to use a mobile application in the context of a traditional, physical retail store would advantageously allow the disclosed system to function beyond the online environment to which it otherwise would be bound.

With this selection of an eligible product having been made, relevant information including the corresponding price-volume break points, the current quantity sold, and the remaining portion of the time window are displayed to the shopper in a step 206. Continuing the two general examples laid out above, in the case of an online shopping portal, this relevant information might be displayed to the shopper as a pop-up window or an area on the specific product page, where the constituent information is received from the disclosed system. In the case of a physical store, this relevant information might be displayed to the shopper as a printed tag or display (preferably updated consistently and frequently) or as an electronic display that presents updated information as it is received.

For example, continuing the example price-volume break points 150 from FIG. 1B, a shopper might notice that 11 gas grills have been sold, triggering a price-volume discount to reduce the price per unit from $699 to $649. In this case, the shopper would be the 12th purchaser of a gas grill and also eligible for the discount. The first ten purchasers of the gas grill (at the original $699 price) may also retroactively be extended the discount via a later redemption or refund, which is discussed subsequently. More generally, because shoppers are presented with the current quantity sold alongside the price-volume break points, shoppers may be more likely to purchase a product if they see that a lower price will be obtained. In an online environment or website, this information can be displayed prominently in association with product information for any given product.

In a step 208, the shopper purchases the product at the current price-volume break point. In some embodiments, the shopper may pay the current price at the time of the transaction and later receive a redemption or refund of any difference between their transacted price and the final price at the end of the time window. In some embodiments, the shopper may pay full price at the time of transaction and later receive a redemption or refund of the difference between the full price and the final price at the end of the time window. It may be desirable to collect full price from all shoppers during the time window in order to make returns less problematic, as the instant discount approach can prove troublesome if subsequent returned units bring the quantity sold back down to a lower price-volume discount (i.e. fewer units sold and higher price). It is appreciated that other redemption mechanisms may also be employed without departing from the scope of the present disclosure.

Upon completing the purchase, transaction information is transmitted from the retail environment to the price-volume optimization system of the present disclosure. Transaction information can include a time of sale, product identifier, purchase quantity, transacted price, information uniquely identifying the purchaser, etc. This unique identifying information is later used in processing and generating redemptions based on the final reduced price achieved at the end of the time window, and can include information such as a credit card number (or hash) associated with the transaction, a debit card number (or hash) associated with the transaction, a rewards account number associated with the transaction (such as a store loyalty rewards program number), or other such account numbers and uniquely identifying information. In online or e-commerce retail environments, a user might be required to log-in to an account in order to access products offered at price-volume break points, such that the log-in or an associated cookie is utilized to identify the user associated with a given transaction. In some embodiments in which a mobile application is provided to shoppers, the mobile computing device running the mobile application might be used to make a contactless payment at a retail terminal, at which point in time the mobile application can transmit a unique identifier to associate the shopper with the transaction.

With the purchase completed, shoppers can next share their purchase with others, either in-person or online, via a step 210. In person, shoppers might share information about their purchase and/or the price-volume break point offer with other shoppers in an attempt to drive more sales to unlock the next higher price-volume break point, for both themselves and others. In an online context, shoppers might take the same initiative for the same reasons. Additionally, in the context of online retail networks, upon purchase a prompt can automatically be generated for the shopper to share information of their purchase and the associated price-volume break points online, for example to various social media platforms, email programs, online forums, etc. The shared information can include all of the same information that is presented to a shopper before their purchase, and may also include an indicator of how many more units need to be purchased to unlock the next price-volume break point and the corresponding discount. The shared information can also be dynamic, such that it continues to update after being shared by a shopper.

As the time window continues to run, additional purchases are made in a step 212, where the additional purchases can be made by new shoppers or existing shoppers having previously made a purchase. In some embodiments, a quantity limit might be imposed, in which case the previously discussed unique identifying information can be utilized to determine whether a given shopper is eligible to purchase any additional units at a price-volume break point. For each new shopper that purchases one or more units in this step, it is contemplated that the step 210 can be repeated, as each shopper attempts to retroactively obtain a lower price for their purchase. At some point, the time window ends in a step 214, although in some embodiments that time window might be updated or otherwise extended based on analyzed trends extracted from the transaction information previously generated during the time window.

Whether or not the time window is extended, once the time window closes in step 214, redemptions or refunds are then generated and transmitted to each unique shopper that purchased (and did not return) one or more units of the product in a step 216. The redemption is taken between the transacted or purchased price paid by the shopper at their time of purchase and the final price at the close of the time window, where the final price is dictated by the price-volume break point into which the total unit purchases tallied in the transaction information falls.

As discussed previously, in some instances it may be desirable to collect full price in each transaction to mitigate the risk of refunds, in which case equal value refunds would be issued for each unit sold during the time window. In instances where shoppers pay the current, possibly reduced price, it is appreciated that refunds issued in step 216 will be of varying value, where the shoppers purchasing the product at full price receive the largest refund per unit and the shoppers purchasing the product at the final price receive no refund. In some embodiments, redemptions and refunds can be generated every time a new price-volume break point is unlocked, which might provide greater shopper satisfaction than the previously described redemption techniques. Additionally, each time that a redemption is generated for a new price-volume break point, the system can generate an additional prompt for the shopper to share with their friends or followers, wherein the prompt might include a tabulation of the discount(s) the shopper has received on the product thus far. The success or share rate of various prompts generated by the system can be tracked and saved, such that successful prompts or prompt techniques receive heavier use or emphasis than less successful ones.

Finally, upon completion of one time window sales cycle, various data generated and received in the process can be saved in a database associated with the price-volume break point optimization system. Such data might include transaction information, shopper information, and information relating to system-generated prompts that were shared and online/social media posts that were generated on the shopper's own accord. Stored historical data might further include information on the overall group of shoppers that purchased the product, such that this defined group may be targeted in the future with additional products or discount opportunities that are determined to be most likely of interest based on the past interactions of these shoppers with the price-volume break point optimization system. For example, past interactions could include previous instances in which the shopper purchased a product offered with price-volume break points, information input by the shopper into an online profile configured with the system, information obtained via a cookie set on a computing device of the shopper by a website associated with the system, and so on.

By implementing the system described above, various retailers and retail networks are able to shift the risk of any price adjustment from themselves to the distributed group of collective shoppers, or even eliminate the risk altogether, which is extremely advantageous. Previously, retailers would set lower prices in the hopes that it would increase sales and thereby increase total profits. If sales were not sufficiently increased, then the retailer would lose money. With the presently disclosed system, the retailer bears no risk— a lower price point is only achieved with sufficient guaranteed or proven demand from the market of shoppers. If the market is unable to provide the demand to support a certain lower price per unit, then the retailer will instead receive the higher price per unit associated with the proven market demand. The shoppers likewise do not bear substantial risk. In the absence of the disclosed system, the shoppers would have been able to purchase the given product only at the full price, so any volume discounts achieved by the price-volume break points are a net positive for the shopper. If, in the worst-case scenario, insufficient quantity is sold to achieve a price-volume discount, then the shopper is no worse off than they would otherwise have been. Further still, retailers and retail networks are not required to estimate market demand or shopper demand functions as they traditionally do—the current system allows a direct observation of the market to be made, and a price per unit to be locked in after this direct observation has been made, an incredibly valuable asset. Of course, to achieve these benefits, the offered price-volume discounts must be accurately calculated before the time window opens for shopper transactions, and must be optimized and updated in order to maintain continued success over multiple time window transaction cycles.

Figure 3:
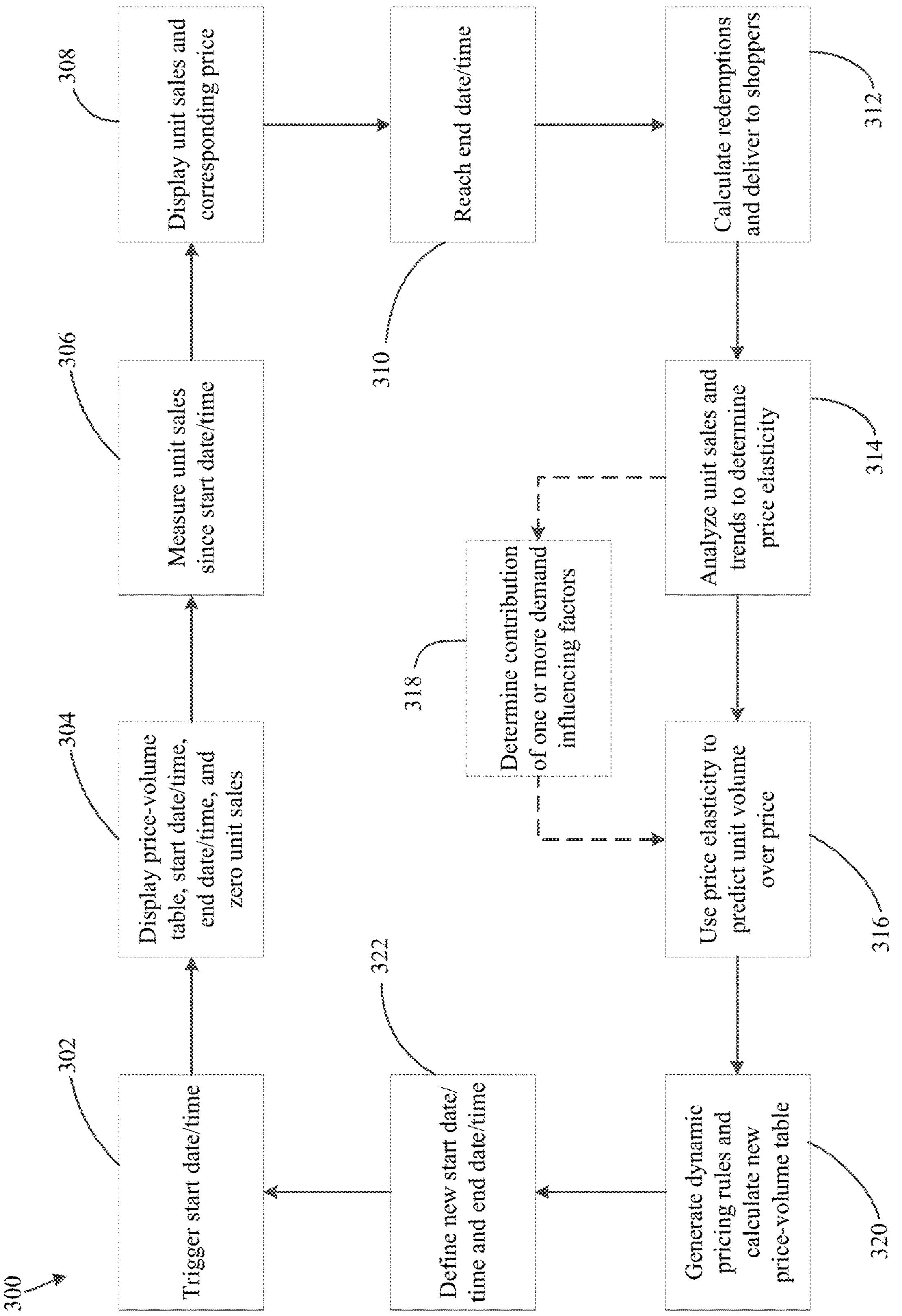
FIG. 3 depicts an example flowchart for cyclically generating pricing rules for calculating price-volume break points.

The disclosure turns now to FIG. 3, which presents a flowchart 300 of an example cyclical process by which the price-volume break point optimization system of the present disclosure operates. Beginning with a step 302, the previously discussed time window is triggered beginning at a given start date and time. For example, a time window might begin at 12 PM Eastern Standard Time on a Monday.

Subsequent to or concurrent with the time window being triggered in step 302, relevant information associated with the price-volume break points and the time window is displayed in a step 304. This relevant information can include a listing of the various price-volume break points, the starting date and time of the time window, the ending date and time of the time window, and the total number of unit sales that have taken place thus far (initially zero). In some embodiments, this relevant information is displayed in a digital form, a physical form, or both at various communicatively coupled retail networks, as discussed previously. In some embodiments, the system itself may act as a central repository of up to date price-volume and quantity sold information. For example, the system might generate a web page or update a web or mobile application with the relevant information, such that shoppers or potential purchasers can visit the web page, web app, or mobile app in order to receive the price-volume information. Additionally, this information can be proactively pushed or distributed to certain shoppers that have requested such alerts or have otherwise provided their contact information. In this manner, interested shoppers can be notified every time a new time window for one or more products opens up. Shoppers may also register their preferences with the system, such that alerts are only received for specified subsets or categories of products or such that alerts are also transmitted a certain amount of time before the time window opens and/or closes.

In a step 306, unit sales of the given product (or products, in embodiments with cross-linked price-volume discounts across multiple products) are measured from the starting date and time at which the time window was triggered. These sales may be tracked passively, as discussed previously, by using credit card numbers, rewards numbers, registration numbers, or other identifiers. These sales may also be tracked actively, for example via the use of a mobile application communicatively coupled to the disclosed system in order to verify and complete the transaction, for example. Additional examples include providing software modules or APIs and/or hardware modules to be integrated with the retail networks point of sale and/or payment processing systems in order to detect and ingest transactions of the given product. For example, a sales tracking platform might be provided to connect to the back end of various e-commerce and online store fronts or otherwise access their transaction data flows, such that the sales tracking platform is able to parse the transactions flowing through these online retail networks and extract the relevant transactions of products subject to a price-volume break point. In some embodiments, online retail network transactions could be processed in substantially real-time, although it is also possible that the transactions could also be processed at a later time, e.g. on a daily or semi-daily basis, either as is desired or as is feasible.

Furthermore, the sales tracking and measuring system can be designed such that there is sufficient bandwidth and processing power available to process multiple ongoing price-volume break points for multiple different products, such that the sale of any relevant product can be detected from the stream of all transactions passing through the one or more retail networks. Provisions can also be put in place in order to protect the privacy and anonymity of all transactions, and particularly any transactions that are external to the system, i.e. transactions of products that are not offered with collective price-volume break points.

In some embodiments, a physical device could be provided to physical retail networks and their associated stores, such that the device integrates a variety of the distributed functionality present in the disclosed system. For example, as a first functionality, a physical device could be coupled or integrated at each point of sale terminal used by the retailer, in order to both capture the transaction information discussed above and to display the price-volume break points and discount offers for various products. The physical device may also offer a user interface to allow shoppers to register their purchased units for a later redemption, register a personal account and customize their user preferences with the system, configure preferences for their redemption, register for various alerts regarding upcoming and closing time windows for different products, share details of their purchase and the associated price-volume break points with their friends or followers, etc. Such an approach would be relatively fine grained, as nearly all retail environments have multiple point of sale systems that would be outfitted with the proposed physical device. Another approach might provide a single physical device per retail store or location, such that each point of sale system couples to the single physical device to achieve the functionality described above.

One of the key functions of such physical devices located on premises in the retail networks would be to display the current unit sales for a given product, and the current price or volume discount that has been achieved for the product, such that shoppers are able to make a more informed purchasing decision. Previously discussed approaches were directed towards an online web page or web portal where a customer could look up the current sales and price information, or a mobile application where a customer could scan a bar code or a product name in order to automatically be served the current sales and price information. Less technological approaches included printed out displays of sales and price information, where such printed displays would also need to include an indicator of when they were printed such that the a shopper knows how current the information is. In an additional approach, printed price tags or stickers could be replaced or supplemented by electronic price tags that are communicatively adapted to receive updated information corresponding to the current sales and price information for the product(s) that the electronic price tags are associated with. For example, electronic price tags could comprise electronic ink or other low power display technology that would make their widespread usage financially viable. As an additional benefit, the presence of an electronic price tag also could function as an indicator or advertiser to a shopper or potential purchaser that the product associated with the electronic price tag is eligible for one or more price-volume break points and discounts, thereby spurring interest and ultimate sales of the product.

Accordingly, in a step 308 these unit sales and the corresponding price are displayed in a step 308. In some embodiments, these figures could be updated in substantially real-time, or with a relatively short refresh period (e.g. less than an hour). Such an approach would provide the greatest transparency to customers. However, it could also be necessary to introduce a delay into the update frequency of the sold quantity in order to prevent fraud and otherwise guarantee a correct unit sales count. For example, some retailers or other individuals may attempt to introduce fake transactions or inflated unit sales counts in order to achieve a price-volume break point and associated discount that otherwise would not have been achieved. Further still, it may be necessary to ensure that all transactions have been finalized or cleared, particularly in the online marketplace and retail networks. As opposed to physical retail stores, wherein a purchase must be paid for in order for the customer to leave the store, online retail networks may collect payment information and register a "soft" sale, and only later attempt to run the payment information to collect the payment and finalize the sale before shipping the product.

The steps 306, 308, and 310 repeat as the time window continues to run, and are eventually terminated at a step 310 when the ending date and time are reached. At this point, any further sales of the product may not be counted towards the total units sold for purposes of calculating the final price-volume break point, and as such, these further sales may not be eligible for any discount or other reduction from the full price of the product.

Next, in a step 312, the system calculates redemptions and transmits them to shoppers. In some instances, the system may handle redemption calculation and transmission directly, i.e. an end-to-end approach to the process. Alternatively, the system can perform the redemption calculation, but rely upon a third party or external payment processor, or the retail networks themselves, to transmit the calculated redemptions to the shoppers. The redemptions can be transmitted as refunds or statement credits, store credit, gift cards, or via any other value bearing instrument recognized by both shoppers and one or more retailers or retail networks.

In a step 314, which may be performed subsequent to or concurrent with step 312, the price-volume break point optimization system analyzes the cumulative transaction data that has been collected across all of the retail networks over the course of the time window in order to determine various price elasticity points for each given product being analyzed. For example, an observed price elasticity can be calculated between each price-volume break point offered for the product. Notably, these price elasticities are actual direct observations, and not inferred price elasticities that are found in other price modeling systems. Because these calculations are made from direct observations of the purchasing habits and tendencies of a target shopper audience, they offer far more value in determining how to update the price-volume break points, if at all, for the product.

The described calculation is in many ways not comparable to traditional price elasticity calculations, for the primary reason that price, or perceived price, is not held constant over the observation period. Where a traditional price elasticity calculation might estimate that shoppers as a whole would buy 100 units if the price was $5 and would buy 200 units if the price was $4, these are two separate and non-overlapping scenarios. That is, shopper demand is simplified to a single, abstract consumption entity. On the other hand, the instant calculation must compensate for the fact that the shoppers who purchase a product earlier in the time window, i.e. at a higher price or higher perceived price, have a more inelastic demand for the product as compared to shoppers purchasing the product at the end of the time window, i.e. at the lowest price that will be reached. However, because each recorded transaction is associated with a time stamp, the price elasticity calculation can account for these varying observed consumer elasticities. As an additional benefit, the system can associate with each consumer having bought the product a perceived relatively elastic demand or a perceived relatively inelastic demand, allowing a shopper profile to be built and leveraged in further analytics and targeted advertisements and offers.

Using these calculated price elasticity points, the price-volume break point optimization system then interpolates a market price elasticity function, where the market is taken to be the pool of shoppers within the retail networks and further recalling that these market price elasticities are distinct from estimated or hypothetical price elasticities utilized in conventional price optimizations and analyses. This interpolated market price elasticity function provides a comprehensive understanding of how the market would respond at any given price point, thereby expanding the elasticity calculations beyond just the discrete price-volume break points that were observed. In some embodiments, the contribution of additional demand influencing factors can be considered in an optional step 318, such that the interpolation step 316 utilizes both the market price elasticities calculated in step 314 and the additional demand influencing factors from step 318. By way of example, additional demand influencing factors might include various external circumstances and conditions that range from global (e.g. seasonality, geopolitical, etc.) to national (e.g. economic strength, regulations, etc.) to local (e.g. affluence, brand loyalty, etc.), and other factors that would be appreciated by one of ordinary skill in the art. With these factors as inputs, the disclosed price-volume break point optimization system is able to generate one or more market price elasticity functions.

In a next step 320, these one or more market price elasticity functions are used to generate, update, and optimize dynamic pricing rules that will govern a future time window cycle of the price-volume break point process described above. It is these dynamic pricing rules themselves that generate updated price-volume break points for future time window cycles, and not simply the market price elasticity functions, as would be seen in traditional price optimization approaches. One implication of this approach is that the dynamic pricing rules can change the underlying structure of the price-volume tables themselves, rather than simply updating the quantity ranges and associated prices of the break points. For example, based on the collected transaction data, which could include historical transaction data from prior time window cycles, the observed market elasticity points, and the interpolated market price elasticity function, the price-volume break point optimization system could determine that an optimal approach would be to segment the shoppers into multiple groups or pools, rather than the single collective group or pool that has been discussed thus far.

For example, while the underlying principle of pooled purchases being used to trigger further break points and volume discounts remains, shoppers could be segmented into one or more smaller groups based on observed or predicted characteristics of the shoppers. Additionally, the dynamic pricing rules might generate different price-volume break point structures for different groups, even though they are all associated with the same product. In this manner, price discrimination or other demographic based targeting can be implemented and optimized. Groupings could also be based on geographical factors, familial relationships, or friendships, both in person and online. Groupings could be based on online interests, social media circles, employers, and so on. Importantly, various market and customer segmentations schemes and metrics known in the art may all be implemented in the context of the present disclosure, which acts to improve existing retail networks and not replace them entirely.

With the new groupings and associated price-volume break point tables calculated and optimized, in a step 322 the system then determines a new starting and ending date and time for a subsequent time window. These time windows might be scheduled regularly, for example running every Monday-Sunday, or might be scheduled sporadically in order to spur greater interest or urgency. The scheduling of the time windows, and the length of the time windows themselves, provide additional factors upon which optimization may be performed, and are included amongst the factors that the dynamic pricing rules are able to manipulate. With the parameters for the next price-volume break point time window cycle thus defined, step 302 begins and the process proceeds anew.

Advantageously, the disclosed price-volume break point optimization system manages to mitigate retailer risk in adjusting prices and allows retailers to sell the largest quantity that the market of shoppers will demand based on the offered price-volume break points. This allows retailers to capture portions of demand that were previously untapped and sell far more units of a given product. The price-volume break points are therefore the most important tool for controlling the market and for driving the ultimate revenues and profits obtained across the various retail networks. In a further advantage, the disclosed price-volume break point optimization system does not have to rely upon conjecture, estimation, or prediction to nearly the same degree as conventional price optimization systems. Because the time windows are relatively small, and can be offered cyclically or repeatedly, the system is able to obtain actual, direct market price elasticity observations, which are directly fed into the optimization system. In this sense, the disclosed optimization system is far more responsive and far closer in proximity to the target market than previously was possible. Further still, the repeated offerings of time windows allow different price-volume break point schemes to be tested under real market conditions with near immediate feedback—if a particular price-volume break point listing produces inferior results as compared to previous weeks, then the dynamic pricing rules can act to roll back these sub-par price-volume break points and instead implement a different, or perhaps less aggressive optimization or modification. In this manner, the disclosed price-volume break point optimization system allows retail networks to reset and begin fresh upon the reset of the time window, with the added advantage of having gained additional market information and a further optimization of the dynamic pricing rules in each prior epoch or time window iteration.

Figure 4A:
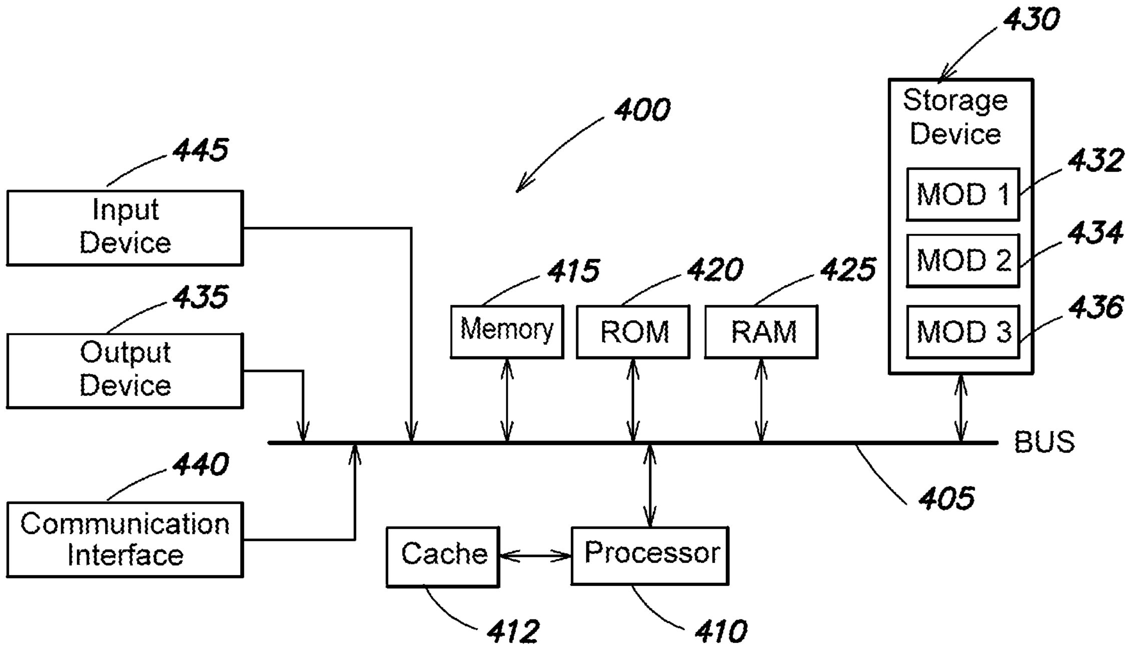
FIG. 4A illustrates a conventional system bus computing system architecture wherein the components of the system are in electrical communication with each other using a bus.
Figure 4B:
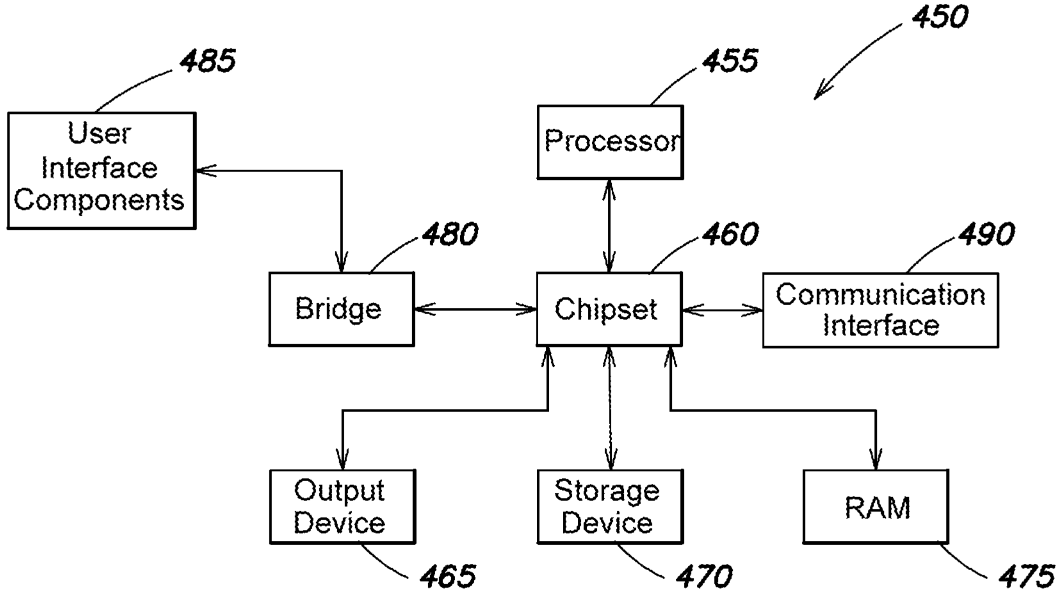
FIG. 4B illustrates an example computer system having a chipset architecture that can be used in executing the described method.

FIG. 4A and FIG. 4B illustrate example computing systems for use as a control device in the example system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory

415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates an example computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output device 465, such as a display, and can read and write information to storage device 470, which can include magnetic media, and solid state media, for example. Chipset 460 can also read data from and write data to RAM 475. A bridge 460 for interfacing with a variety of user interface components 465 can be provided for interfacing with chipset 460. Such user interface components 465 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 465 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A non-transitory computer-readable storage medium comprising instructions stored therein which, when executed by one or more processors cause the one or more processors to perform operations comprising:

calculate a plurality of target price-volume break points for a product, each of the price-volume break points includes a target selling quantity range and an associated price for the product;

trigger a time window for which the plurality of price-volume break points will be offered;

receive, for each transaction of the product occurring during the time window and corresponding to a unique purchaser of the product, transaction information comprising a transacted quantity for the unique purchaser and a transacted price for the unique purchaser, wherein receiving the transaction information comprises processing a data flow of a plurality of electronic transactions of one or more retail networks, via one or more software or hardware modules integrated with point of sale systems or payment processing systems of the one or more retail networks, to detect and ingest transactions of the product;

determine, for each received transaction, that the respective transaction is finalized or cleared for inclusion;

updating a cumulative quantity of sales based on adding the transacted quantity for each received transaction to a current cumulative quantity of sales of the product during the time window;

determine a current offered price-volume break point based on determining that a total cumulative quantity of sales during the time window is within a respective target selling quantity range;

distribute, to the one or more retail networks for display via a point of sale system or electronic price tag of the one or more retail networks, updated values of the current cumulative quantity of sales and the current offered price-volume break point according to a defined update schedule that includes an introduced delay configured to prevent fraud and guarantee a correct unit sales count;

after an expiration of the time window, generate redemptions to each unique purchaser of the product during the time window, each respective redemption based on a difference between the transacted price for the unique purchaser and a final price, wherein the final price is based on a final offered price-volume break point corresponding to the total cumulative quantity of sales at the expiration of the time window;

transmit, to each unique purchaser, the respective redemption, wherein the respective redemption refunds to each unique purchaser the difference between the transacted price for the unique purchaser and the final price;

calculate an observed market price elasticity for each of the plurality of price-volume break points;

interpolate a market price elasticity function based at least in part on the observed market price elasticities; and optimize over the interpolated market price elasticity function to generate dynamic pricing rules, wherein the dynamic pricing rules are used to calculate updated price-volume break points for the product.

2. The non-transitory computer-readable storage medium of claim 1, the operations further comprising:

after the optimizing, returning to the calculate a plurality of target price-volume break points for a product, where the calculate is based on the updated price-volume break points for the product from the optimizing.

3. The non-transitory computer-readable storage medium of claim 1, wherein the transaction information is received from one or more disparate retail networks such that each transaction of the product is associated with only one of the disparate retail networks.

4. The non-transitory computer-readable storage medium of claim 1, the operations further comprising:

cause presentation of the plurality of target price-volume break points for the product to a purchaser, wherein the presentation is indicative of:

the current cumulative quantity of sales of the product during the time window;

a corresponding price-volume break point for the current cumulative quantity of sales; and a remaining time within the time window for the product.

5. The non-transitory computer-readable storage medium of claim 1, the operations further comprising:

update the time window at least once before the expiration of the time window, wherein a number of updates is based at least in part on a sales trend.

6. The non-transitory computer-readable storage medium of claim 1, wherein the redemptions are generated based on a difference between the transacted price and a final price, wherein the final price is an associated price based on the current offered price-volume break point associated with the total transacted quantity at the expiration of the time window.

7. The non-transitory computer-readable storage medium of claim 1, the operations further comprising:

optimizing over one or more of product profit, product revenue, retail network profit, retail network revenue, customer volume, and social media discussion.

8. The non-transitory computer-readable storage medium of claim 1, wherein processing the data flow of the plurality of electronic transactions comprises processing, to preserve anonymity and privacy of the unique purchasers, the data flow of the plurality of electronic transactions to include only transactions related to the product and to exclude all other transactions related to products that are not offered via the plurality of target price-volume break points.

9. A method comprising:

calculating a plurality of target price-volume break points for a product, each of the price-volume break points includes a target selling quantity range and an associated price for the product;

triggering a time window for which the plurality of price-volume break points will be offered;

receiving, for each transaction of the product occurring during the time window and corresponding to a unique purchaser of the product, transaction information comprising a transacted quantity for the unique purchaser and a transacted price for the unique purchaser, wherein receiving the transaction information comprises processing a data flow of a plurality of electronic transactions of one or more retail networks, via one or more software or hardware modules integrated with point of sale systems or payment processing systems of the one or more retail networks, to detect and ingest transactions of the product;

determining, for each received transaction, that the respective transaction is finalized or cleared for inclusion;

updating a cumulative quantity of sales based on adding the transacted quantity for each received transaction to a current cumulative quantity of sales of the product during the time window;

determining a current offered price-volume break point based on determining that a total cumulative quantity of sales during the time window is within a respective target selling quantity range;

distributing, to the one or more retail networks for display via a point of sale system or electronic price tag of the one or more retail networks, updated values of the current cumulative quantity of sales and the current offered price-volume break point according to a defined update schedule that includes an introduced delay configured to prevent fraud and guarantee a correct unit sales count;

after an expiration of the time window, generating redemptions to each unique purchaser of the product during the time window, each respective redemption based on a difference between the transacted price for the unique purchaser and a final price, wherein the final price is based on a final offered price-volume break point corresponding to the total cumulative quantity of sales at the expiration of the time window;

transmitting, to each unique purchaser, the respective redemption, wherein the respective redemption refunds to each unique purchaser the difference between the transacted price for the unique purchaser and the final price;

calculating an observed market price elasticity for each of the plurality of price-volume break points;

interpolating a market price elasticity function based at least in part on the observed market price elasticities; and optimizing over the interpolated market price elasticity function to generate dynamic pricing rules, wherein the dynamic pricing rules are used to calculate updated price-volume break points for the product.

10. The method of claim 9, further comprising:

after the optimizing, returning to the calculate a plurality of target price-volume break points for a product, where the calculate is based on the updated price-volume break points for the product from the optimizing.

11. The method of claim 9, wherein the transaction information is received from one or more disparate retail networks such that each transaction of the product is associated with only one of the disparate retail networks.

12. The method of claim 9, further comprising:

cause presentation of the plurality of target price-volume break points for the product to a purchaser, wherein the presentation is indicative of:

the current cumulative quantity of sales of the product during the time window;

a corresponding price-volume break point for the current cumulative quantity of sales; and a remaining time within the time window for the product.

13. The method of claim 9, further comprising update the time window at least once before the expiration of the time window, wherein a number of updates is based at least in part on a sales trend.

14. The method of claim 9, wherein the redemptions are generated based on a difference between the transacted price and a final price, wherein the final price is an associated price based on the current offered price-volume break point associated with the total transacted quantity at the expiration of the time window.

15. The method of claim 9, further comprising optimizing over one or more of product profit, product revenue, retail network profit, retail network revenue, customer volume, and social media discussion.

16. A system comprising:

one or more processors; and at least one computer-readable storage medium comprising instructions stored thereon, which when executed by the one or more processors, cause the system to perform operations comprising:

calculate a plurality of target price-volume break points for a product, each of the price-volume break points includes a target selling quantity range and an associated price for the product;

trigger a time window for which the plurality of price-volume break points will be offered;

receive, for each transaction of the product occurring during the time window and corresponding to a unique purchaser of the product, transaction information comprising a transacted quantity for the unique purchaser and a transacted price for the unique purchaser, wherein receiving the transaction information comprises processing a data flow of a plurality of electronic transactions of one or more retail networks, via one or more software or hardware modules integrated with point of sale systems or payment processing systems of the one or more retail networks, to detect and ingest transactions of the product;

determine, for each received transaction, that the respective transaction is finalized or cleared for inclusion;

update a cumulative quantity of sales based on adding the transacted quantity for each received transaction to a current cumulative quantity of sales of the product during the time window;

determine a current offered price-volume break point based on determining that a total cumulative quantity of sales during the time window is within a respective target selling quantity range;

distribute, to the one or more retail networks for display via a point of sale system or electronic price tag of the one or more retail networks, updated values of the current cumulative quantity of sales and the current offered price-volume break point according to a defined update schedule that includes an introduced delay configured to prevent fraud and guarantee a correct unit sales count;

after an expiration of the time window, generate redemptions to each unique purchaser of the product during the time window, each respective redemption based on a difference between the transacted price for the unique purchaser and a final price, wherein the final price is based on a final offered price-volume break point corresponding to the total cumulative quantity of sales at the expiration of the time window;

transmit, to each unique purchaser, the respective redemption, wherein the respective redemption refunds to each unique purchaser the difference between the transacted price for the unique purchaser and the final price;

calculate an observed market price elasticity for each of the plurality of price-volume break points;

interpolate a market price elasticity function based at least in part on the observed market price elasticities; and optimize over the interpolated market price elasticity function to generate dynamic pricing rules, wherein the dynamic pricing rules are used to calculate updated price-volume break points for the product.

17. The system of claim 16, the operations further comprising:

after the optimizing, returning to the calculate a plurality of target price-volume break points for a product, where the calculate is based on the updated price-volume break points for the product from the optimizing.

18. The system of claim 16, wherein the transaction information is received from one or more disparate retail networks such that each transaction of the product is associated with only one of the disparate retail networks.

19. The system of claim 16, the operations further comprising:

cause presentation of the plurality of target price-volume break points for the product to a purchaser, wherein the presentation is indicative of:

the current cumulative quantity of sales of the product during the time window;

a corresponding price-volume break point for the current cumulative quantity of sales; and a remaining time within the time window for the product.

20. The system of claim 16, the operations further comprising update the time window at least once before the expiration of the time window, wherein a number of updates is based at least in part on a sales trend.

21. The system of claim 16, wherein the redemptions are generated based on a difference between the transacted price and a final price, wherein the final price is an associated price based on the current offered price-volume break point associated with the total transacted quantity at the expiration of the time window.

* * * * *